United States Patent
Jinno et al.

(10) Patent No.: US 9,815,332 B2
(45) Date of Patent: Nov. 14, 2017

(54) WORKING VEHICLE

(71) Applicant: Takeuchi Mfg. Co., Ltd., Nagano (JP)

(72) Inventors: Yuuki Jinno, Nagano (JP); Shumpei Okutani, Ueda (JP)

(73) Assignee: TAKEUCHI MFG. CO., LTD., Nagano (JP)

( * ) Notice: Subject to any disclaimer, the term of this patent is extended or adjusted under 35 U.S.C. 154(b) by 0 days.

(21) Appl. No.: 14/879,267

(22) Filed: Oct. 9, 2015

(65) Prior Publication Data
US 2017/0050562 A1 Feb. 23, 2017

(30) Foreign Application Priority Data

Aug. 18, 2015 (JP) ................................ 2015-161425

(51) Int. Cl.
*B60Q 1/00* (2006.01)
*B60C 9/00* (2006.01)
(Continued)

(52) U.S. Cl.
CPC .............. *B60C 9/00* (2013.01); *E02F 9/0883* (2013.01); *E02F 9/267* (2013.01); *G01F 23/00* (2013.01);
(Continued)

(58) Field of Classification Search
CPC .................... B60Q 9/00; G01F 23/00
See application file for complete search history.

(56) References Cited

U.S. PATENT DOCUMENTS 5,831,536 A * 11/1998 Zager ..................... H01H 36/02
340/450
6,278,281 B1 * 8/2001 Bauer ................ G01N 33/2888
324/441

(Continued)

FOREIGN PATENT DOCUMENTS

EP 2216520 A1 8/2010
JP H10-197314 A 7/1998
(Continued)

OTHER PUBLICATIONS

The extended European search report issued by the European Patent Office dated Jan. 20, 2017, which corresponds a European Patent Application No. 15188680.1-1712 and is related to U.S. Appl. No. 14/879,267.

*Primary Examiner* — Erin File
(74) *Attorney, Agent, or Firm* — Studebaker & Brackett PC (57) ABSTRACT

A working vehicle according to the present invention is configured with a fuel tank, a fuel sensor for detecting an amount of fuel stored in the fuel tank, and an informing device (a controller, informing switch, and speaker) for informing the stored amount of fuel detected by the fuel sensor, by changing the informing pattern in response to this stored amount of fuel. The working vehicle is also configured with an exhaust gas purification system for purifying exhaust gas using urea water, a urea water tank, a urea water sensor for detecting the amount of urea water stored in the urea water tank, and an informing device (the controller, informing switch, and speaker) for informing a stored amount of urea water detected by the urea water sensor, by changing the informing pattern in response to this stored amount of urea water.

15 Claims, 4 Drawing Sheets

(51) Int. Cl.
*G01F 23/00* (2006.01)
*E02F 9/08* (2006.01)
*E02F 9/26* (2006.01)
*B60K 15/03* (2006.01)

(52) U.S. Cl.
CPC ............... *G01F 23/0061* (2013.01); *B60K 2015/03203* (2013.01); *F01N 2610/142* (2013.01)

(56) References Cited

U.S. PATENT DOCUMENTS

| | | | | |
|---|---|---|---|---|
| 7,287,556 | B2* | 10/2007 | Boyle | G01F 23/0061 141/198 |
| 9,080,529 | B1* | 7/2015 | Klughart | F02D 41/2467 |
| 2003/0156019 | A1* | 8/2003 | Lehmann | B60Q 5/005 340/435 |
| 2005/0022515 | A1* | 2/2005 | Stiermann | B01D 53/9431 60/286 |
| 2009/0025370 | A1* | 1/2009 | Kondo | B01D 53/90 60/286 |
| 2009/0243822 | A1* | 10/2009 | Hinninger | B60Q 9/008 340/435 |
| 2010/0199642 | A1 | 8/2010 | Koide et al. | |
| 2012/0066825 | A1* | 3/2012 | Birbara | A47K 11/12 4/309 |
| 2013/0321143 | A1* | 12/2013 | Boyer | B60Q 1/44 340/463 |
| 2014/0266650 | A1 | 9/2014 | Newhouse | |
| 2015/0127212 | A1* | 5/2015 | Chacon | B60R 21/013 701/32.4 |

FOREIGN PATENT DOCUMENTS

| | | |
|---|---|---|
| JP | 2003-002399 A | 1/2003 |
| JP | 2010180861 A | 8/2010 |
| JP | 2014-173448 A | 9/2014 |
| JP | 5718513 B | 3/2015 |

* cited by examiner

WORKING VEHICLE

RELATED APPLICATIONS

This invention claims the benefit of Japanese Patent Application No. 2015-161425 which is hereby incorporated by reference.

TECHNICAL FIELD

The present invention relates to a working vehicle for driving a travel unit and a working device by using power of an engine.

TECHNICAL BACKGROUND

A skid-steer loader disclosed in, for example, Japanese Patent No. 5718513 has been known as an example of the working vehicle described above. The skid-steer loader has, on either side of its vehicle main body, a travel unit including tires or a crawler and changes the direction of travel by differentiating operating speeds between the right and left travel units. The vehicle main body of such a skid-steer loader is provided with an arm that swings up and down, in which an attachment (a working device) mounted detachably onto an arm tip end is moved vertically by swinging the arm up and down in order to perform work. The rear of the vehicle is equipped with an engine for driving the travel unit and the working device and a fuel tank for storing fuel supplied to the engine.

There has been known a working vehicle disclosed in, for example, Japanese Laid-Open Patent Publication No. 2010-180861 (A), which has an exhaust gas purification system for removing nitrogen oxides ($NO_x$) contained in exhaust gas of an engine by using urea water. This type of working vehicle is equipped with a urea water storage tank for storing urea water supplied to the exhaust gas purification system, and therefore needs to be constantly replenished with urea water.

In order to replenish the tank of such working vehicle with fuel and urea water, the fuel or urea water is often supplied from a portable can (a portable tank) at a working site or the like. In so doing, the replenishment operation is performed while checking the fluid level through the replenishing port or checking the amount of fuel or urea water stored in the tank by looking at the fuel meter or urea water meter provided in the driver's seat, to prevent the overflow of the fuel or urea water from the replenishing port when the tank becomes full. However, in some cases it is difficult to see the fluid level inside the replenishing port, depending on the level of the ambient brightness, and sometimes the meter provided in the driver's seat and the replenishing port have to be checked back and forth during the replenishment operation, creating a burden for the person performing the replenishment operation and consequently making the replenishment operation troublesome.

The present invention was contrived in view of the foregoing problems, and an object thereof is to provide a working vehicle capable of easily performing a fuel or urea water replenishment operation.

SUMMARY OF THE INVENTION

In order to achieve the foregoing object, a working vehicle according to the present invention has: a vehicle equipped with an engine; a fuel tank for storing fuel supplied to the engine; a fuel sensor for detecting a stored amount of fuel stored in the fuel tank; and an informing device (e.g., a controller 60, an informing switch 65, and a speaker 66 according to an embodiment) for informing the stored amount detected by the fuel sensor, by changing an informing pattern in response to this stored amount.

In addition, a working vehicle according to the present invention has: a vehicle equipped with an engine; an exhaust gas purification system for purifying exhaust gas discharged from the engine, by using urea water; a urea water tank for storing urea water supplied to the exhaust gas purification system; a urea water sensor for detecting a stored amount of urea water stored in the urea water tank; and an informing device (e.g., the controller 60, informing switch 65, and speaker 66 according to the embodiment) for informing the stored amount detected by the urea water sensor, by changing an informing pattern in response to this stored amount.

In each of the foregoing working vehicles configured as described above, it is preferred that the informing device has an informing switch provided in the vicinity of a replenishing port of the tank, the informing being performed when the informing switch is turned on. In this configuration, the informing device is preferably configured to automatically stop the informing after the passage of a predetermined time period since the informing switch is turned on.

In each of the foregoing working vehicles configured as described above, it is preferred that the informing device perform the informing using at least either sound or light.

According to the working vehicle of the present invention that is configured as described above, the stored amount, the amount of fuel stored in the fuel tank, is detected by the fuel sensor, and the informing device executes informing of the detected amount of fuel stored, by changing the informing pattern in response to the amount of fuel stored. Owing to this configuration, the amount of fuel stored in the fuel tank can be obtained without checking the fuel filler opening or the fuel meter in the driver's seat, as is performed conventionally. This configuration, therefore, can prevent the overflow of the fuel from the fuel filler opening when the fuel tank becomes full during the fuel supply operation. Consequently, the fuel supply operation can easily be carried out with less burden for the person performing the fuel supply operation.

According to the working vehicle of the present invention, the stored amount, the amount of urea water stored in the urea water tank, is detected by the urea water sensor, and the informing device executes informing of the detected amount of urea water stored, by changing the informing pattern in response to the amount of urea water stored. Owing to this configuration, the amount of urea water stored in the urea water tank can be obtained without checking the urea water replenishing port or the urea water meter in the driver's seat, as is performed conventionally. This configuration, therefore, can prevent the overflow of the urea water from the replenishing port when the urea water tank becomes full during the replenishment operation. Consequently, the urea water replenishment operation can easily be carried out.

Furthermore, according to each of the foregoing working vehicles configured as described above, the informing device has an informing switch provided in the vicinity of the replenishing port of the tank, with the informing being performed when the informing switch is turned on. In this configuration, the replenishment operation can be carried out at once when the person comes to the vicinity of the replenishing port of the tank and turns the informing switch on. In this configuration, the informing device is configured to automatically stop the informing after the passage of a predetermined time period since the informing switch is turned on, preventing the person performing the replenishment operation from forgetting to turn off the informing device (the informing switch).

According to each of the foregoing working vehicles configured as described above, the informing device is configured to execute the informing using at least either sound or light, so that the informing device can audibly or visually notify the person performing the replenishment operation of the stored amount in the tank.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

FIG. 2 is a diagram showing the skid-steer loader, wherein

DESCRIPTION OF THE EMBODIMENTS

Figure 3:
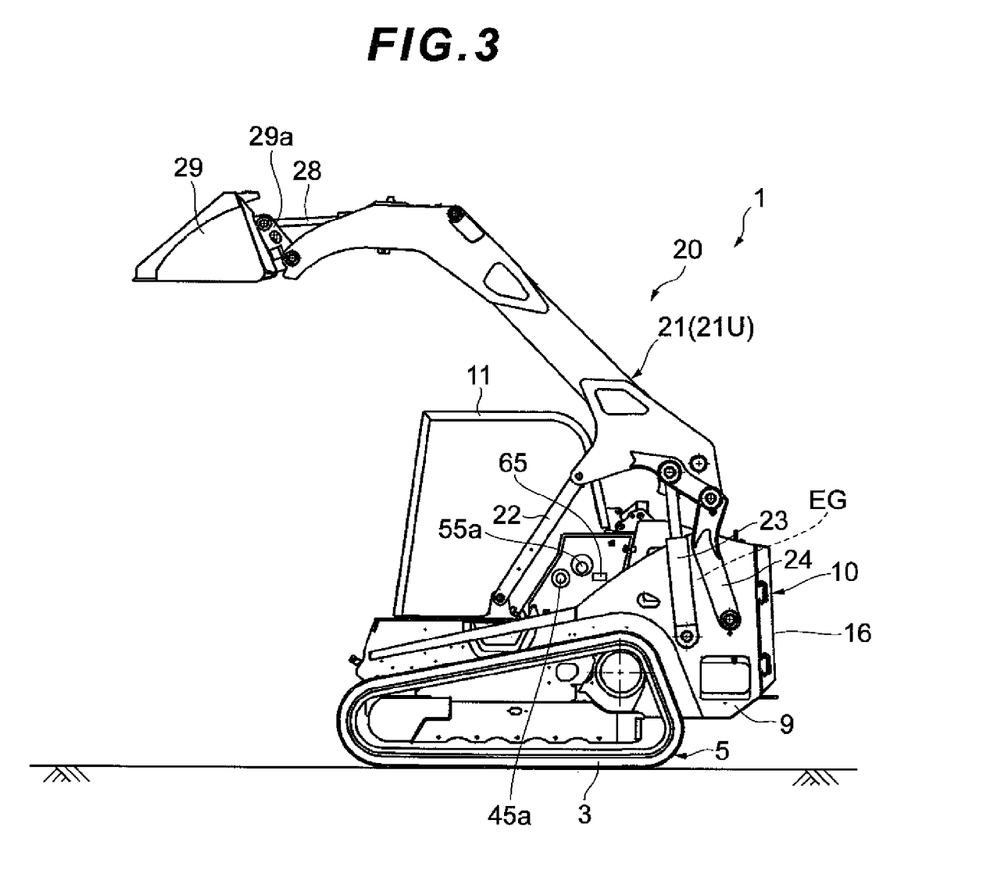
FIG. 3 is a left side view showing a state in which the arm of the skid-steer loader is swung to a highest swing position.

An embodiment of the present invention is now described hereinafter with reference to the drawings. The present embodiment describes an example in which the present invention is applied to a crawler skid-steer loader (referred to as "crawler loader," hereinafter) having a bucket installed at a tip end of an arm. First of all, the entire configuration of a crawler loader 1 is described with reference to FIGS. 1 to 3.

Figure 1:
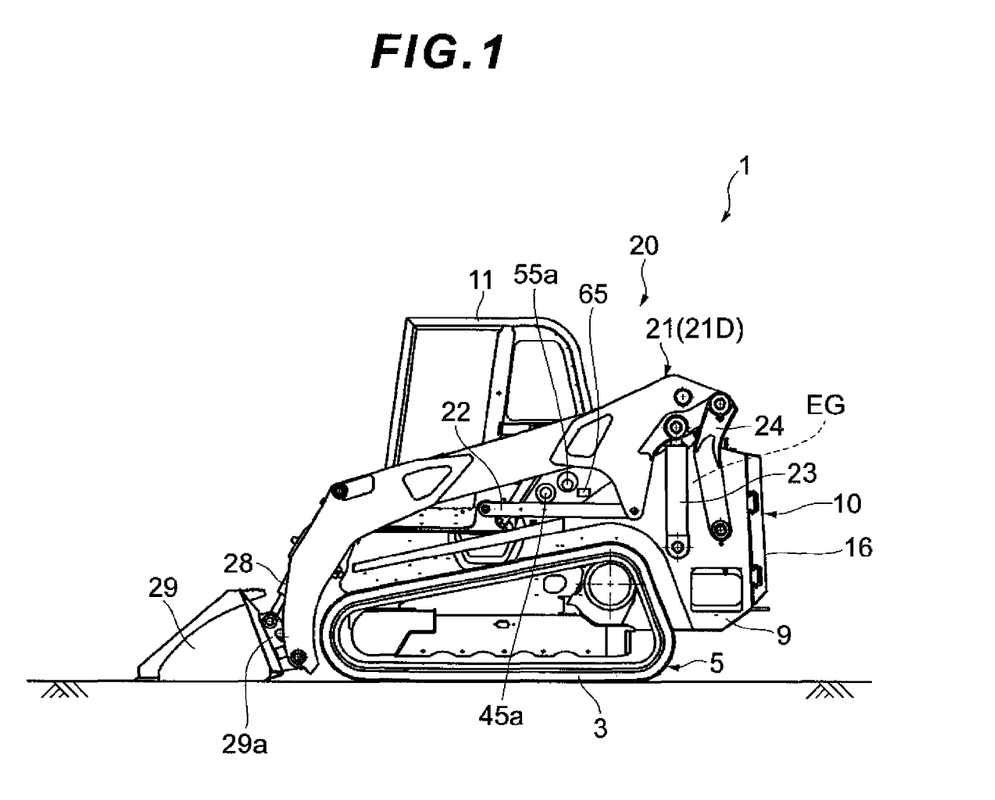
FIG. 1 is a left side view showing a state in which an arm of a crawler skid-steer loader, to which the present invention is applied, is swung to a lowest swing position.
Figure 2A:
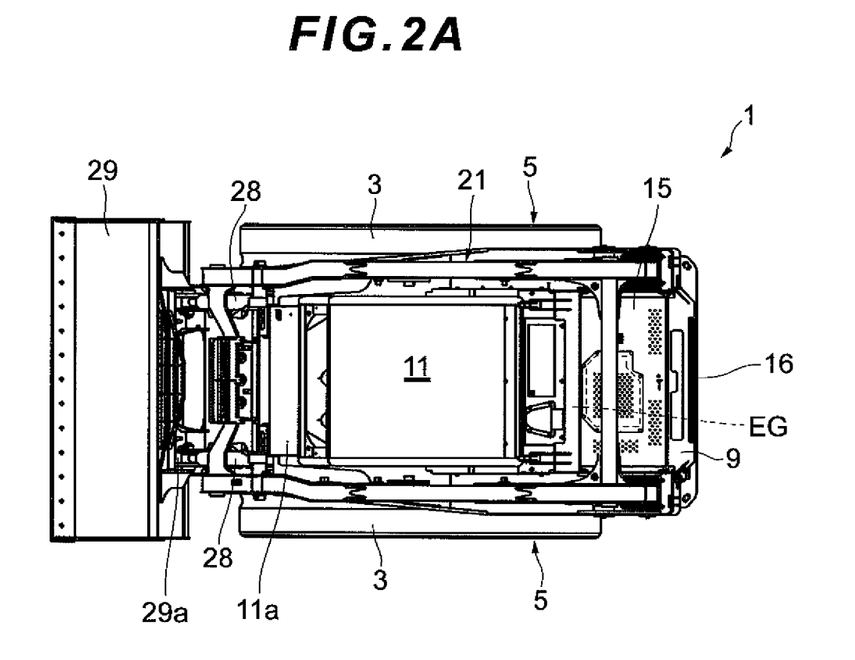
FIG. 2A is a plan view and FIG. 2B is a front view.
Figure 2B:
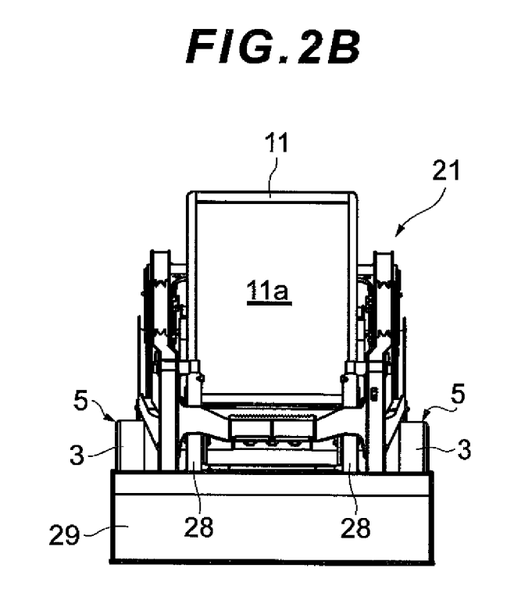

As shown in FIG. 1, the crawler loader 1 is configured with a pair of right and left travel units 5 with endless crawler belts 3, a main body frame 9 mounted with these travel units 5 on its right- and left-hand sides, a loader device 20 mounted on the main body frame 9, and an operator cabin 11 provided in a central upper portion of the main body frame 9. The combination of the travel units 5 and the main body frame 9 is referred to as "vehicle 10," hereinafter.

The operator cabin 11 is in the shape of a box, in which the vehicle front side thereof is opened, and this open portion is provided with a front door ha that opens and closes. An operator seat (not shown) in which an operator is seated facing the vehicle front side is provided inside the operator cabin 11. Operation levers (not shown) for operating the drive of the travel units 5 and the loader device 20 are disposed on the right- and left-hand sides of the operator seat. A main switch 13 of the vehicle 10, a fuel meter 17 for displaying the amount of fuel stored in a fuel tank 45 described hereinafter, and a urea water meter 18 for displaying the amount of urea water stored in a urea water tank 55 described hereinafter, are provided inside the operator cabin 11 (see FIG. 4).

The loader device 20 is mounted on the main body frame 9, as described above, in which a plurality of pivoting points for mounting the loader device 20 are provided in the main body frame 9. The loader device 20 is configured with an arm 21 that is disposed in such a manner as to surround the front, rear, left and right sides of the operator cabin 11, a pair of right and left control links 22 mounted across the main body frame 9 and the arm 21, a pair of right and left arm cylinders 23 mounted across the main body frame 9 and the arm 21 at the rear side of the control links 22, a pair of right and left lift links 24 mounted across the main body frame 9 and the arm 21 at the rear side of the arm cylinders 23, and a bucket 29 mounted on a front end portion of the arm 21 by a bracket 29a. The pairs of right and left control links 22, arm cylinders 23, and lift links 24 are provided bilaterally symmetrically, and the arm 21 is mounted onto the main body frame 9 via the control links 22, arm cylinders 23, and lift links 24.

The bracket 29a is pivoted to a tip end portion of the arm 21 so as to be able to swing vertically, and the bucket 29 is mounted detachably onto the bracket 29a. The bucket 29 (the bracket 29a) is swung vertically with respect to the arm 21 by expansion and contraction of bucket cylinders 28 provided at the tip end side of the arm 21.

In the crawler loader 1, the operator seats himself in the operator seat and operates the operation levers, and operation of operation levers can drive the travel units 5 to run the vehicle 10, swing the arm 21 up and down by expanding and contracting the arm cylinders 23, and swing the bucket 29 up and down by expanding and contracting the bucket cylinders 28. Expansion and contraction of the arm cylinders 23 can swing the arm 21 up and down between a lowest swing position 21D and a highest swing position 21U.

The crawler loader 1 is further provided with a diesel engine EG (referred to as "engine EG," hereinafter) behind the operator cabin 11, the fuel tank 45 (see FIG. 4) for storing fuel supplied to the engine EG, and a fuel feeder 46 (see FIG. 4) consisting of a fuel pump and the like for supplying the fuel of the fuel tank 45 to the engine EG. The right- and left-hand sides of the foregoing engine EG and the like are covered with a side frame of the main body frame 9, and the upper and rear sides of the same are covered with an engine cover 15 and a rear door 16. The travel units 5, arm cylinders 23, and bucket cylinders 28 are driven by hydraulic oil that is supplied from a hydraulic pump driven by the engine EG.

Figure 4:
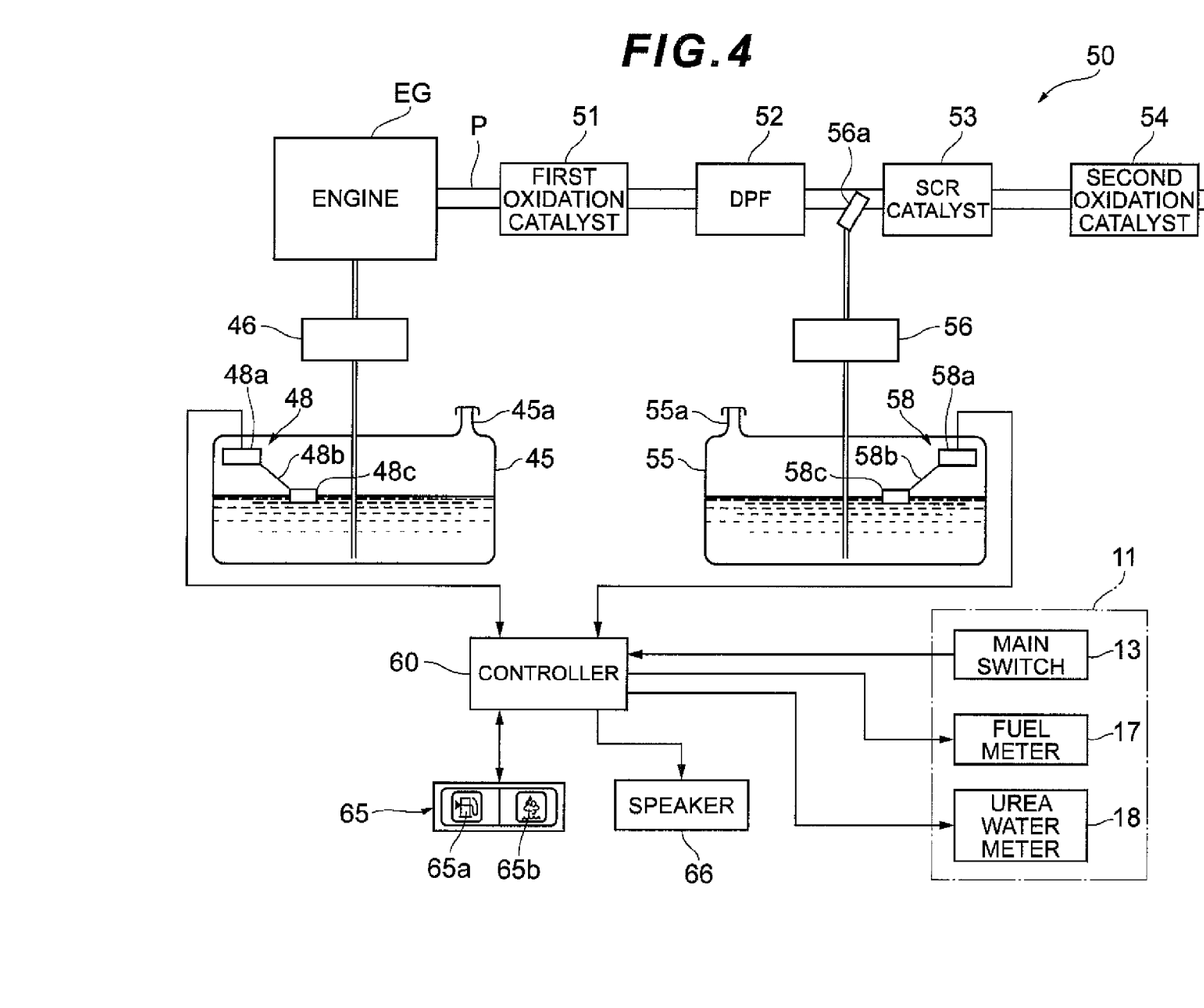
FIG. 4 is a block diagram showing the configurations of an exhaust gas purification system and an informing device, which are provided in the skid-steer loader.

As shown in FIG. 4, the crawler loader 1 also has an exhaust gas purification system 50 for purifying exhaust gas discharged from the engine EG. The exhaust gas purification system 50 is configured with a first oxidation catalyst 51 provided in an exhaust pipe P of the engine EG and for oxidizing nitrogen monoxide (NO) into nitrogen dioxide ($NO_2$), a diesel particulate filter 52 (referred to as "DPF 52," hereinafter) provided at the downstream side of the first oxidation catalyst 51 and for capturing particulate matter (referred to as "PM," hereinafter) contained in the exhaust gas, an SCR (Selective Catalytic Reduction) catalyst 53 provided at the downstream side of the DPF 52 and for reducing nitrogen oxide ($NO_x$) into nitrogen and water by a chemical reaction between ammonia ($NH_3$) and the nitrogen oxide, a second oxidation catalyst 54 provided at the downstream side of the SCR catalyst 53 and for oxidizing the remaining ammonia that is not consumed in the chemical reaction in the SCR catalyst 53, the urea water tank 55 for storing urea water supplied to the SCR catalyst 53, and a urea water feeder 56 having a urea water pump, a urea injector 56a and the like for supplying the urea water of the urea water tank 55 to the SCR catalyst 53.

In the exhaust gas purification system 50, the exhaust gas discharged from the engine EG flows into the first oxidation catalyst 51 first through the exhaust pipe P, and the nitrogen monoxide of the exhaust gas is oxidized into nitrogen dioxide by the first oxidation catalyst 51. Next, the exhaust gas flows into the DPF 52, and the PM contained in the exhaust gas is captured by the DPF 52. Subsequently, the exhaust gas flows into the SCR catalyst 53. At this moment, the urea water feeder 56 supplies the urea water of the urea water tank 55 to the urea injector 56a, and the urea water is injected from the urea injector 56a and added to the SCR catalyst 53. The urea water added to the SCR catalyst 53 is hydrolyzed into ammonia and carbon dioxide, and nitrogen and water are obtained by a reaction between this ammonia and the nitrogen oxide of the exhaust gas. The remaining ammonia that is not consumed in the SCR catalyst 53 is oxidized by the second oxidation catalyst 54. The exhaust gas purification system 50 is configured to remove the PM and nitrogen oxide of the exhaust gas in this manner.

A fuel sensor 48 for detecting the stored amount (residual amount) of fuel stored in the fuel tank 45 is provided inside the fuel tank 45. The fuel sensor 48 is configured with a sensor main body 48a mounted onto an upper portion of the fuel tank 45, and a float 48c connected to the sensor main body 48a by an arm 48b and placed afloat on the fluid level of the fuel. The fuel sensor 48 detects the amount of fuel stored based on the position of the fluid level that is obtained from the position of the float 48c, and sends the data on the detected amount of fuel stored to the controller 60.

A urea water sensor 58 for detecting the stored amount (residual amount) of urea water stored in the urea water tank 55 is provided inside the urea water tank 55. As with the fuel sensor 48, the urea water sensor 58 is configured with a sensor main body 58a mounted onto an upper portion of the urea water tank 55, and a float 58c connected to the sensor main body 58a by an arm 58b and placed afloat on the fluid level of the urea water. The urea water sensor 58 detects the amount of urea water stored based on the position of the fluid level that is obtained from the position of the float 58c, and sends the data on the detected amount of urea water stored to the controller 60.

A fuel filler opening 45a of the fuel tank 45 and a replenishing port 55a of the urea water tank 55 are provided on the left-hand side of the operator cabin 11 of the crawler loader 1 (see FIG. 1). The informing switch 65 and the speaker 66 are provided in the vicinity of the fuel filler opening 45a and the replenishing port 55a. Note that the controller 60, the informing switch 65 and the speaker 66 construct an informing device that reports the amount of fuel stored in the fuel tank 45 and the amount of urea water stored in the urea water tank 55.

The informing switch 65 is a rectangular seesaw switch extending laterally, which tilts to the direction in which it is pressed by a finger, and automatically returns to its neutral position when the finger is released. Pressing the left side of the informing switch 65 transmits a fuel replenishment mode ON signal to the controller 60. Pressing the right side of the informing switch 65 transmits a urea water replenishment ON signal to the controller 60. The left and right sides of the informing switch 65 are provided respectively with a fuel replenishment mode light-emitting portion 65a and a urea water replenishment mode light-emitting portion 65b, each of which has a semitransparent surface and is configured to emit light through its internal light-emitting source.

In response to the fuel replenishment mode ON signal from the informing switch 65, the controller 60 causes the fuel replenishment mode light-emitting portion 65a of the informing switch 65 to emit light and causes the speaker 66 to generate a sound. In so doing, the controller 60 changes the light emission pattern of the fuel replenishment mode light-emitting portion 65a and the sound generation pattern of the speaker 66 in accordance with the amount of fuel stored in the fuel tank 45 that is detected by and transmitted from the fuel sensor 48. Specifically, when, for example, the amount of fuel stored in the fuel tank 45 is less than 50%, the speaker 66 generates a buzzer sound at long intervals, such as "beep . . . beep . . . beep . . . " (e.g., a buzzer sound of a two-second interval, of which 10% (i.e., 0.2 seconds) generates the sound and 90% (i.e., 1.8 seconds) is silent), and the fuel replenishment mode light-emitting portion 65a emits flashing light at the same intervals. Also, when the amount of fuel stored is equal to or greater than 50% but less than 75%, the speaker 66 generates a buzzer sound at short intervals, such as "beep, beep, beep" (e.g., a buzzer sound of a 0.6-second interval, of which 33% (i.e., 0.2 seconds) generates the sound and 67% (i.e., 0.4 seconds) is silent), and the fuel replenishment mode light-emitting portion 65a emits flashing light at the same intervals. When the amount of fuel stored is equal to or greater than 75%, the speaker 66 generates a continuous sound such as "beeeeeeeep," and the fuel replenishment mode light-emitting portion 65a continuously emits flashing light.

Moreover, in response to the urea water replenishment mode ON signal from the informing switch 65, the controller 60 causes the urea water replenishment mode light-emitting portion 65b of the informing switch 65 to emit light and causes the speaker 66 to generate a sound. In so doing, the controller 60 changes the light emission pattern of the urea water replenishment mode light-emitting portion 65b and the sound generation pattern of the speaker 66 in accordance with the amount of urea water stored in the urea water tank 55 that is detected by and transmitted from the urea water sensor 58. Specifically, as in the fuel replenishment mode described above, when, for example, the amount of urea water stored in the urea water tank 55 is less than 50%, the speaker 66 generates a buzzer sound at long intervals, such as "beep . . . beep . . . beep . . . ," and the urea water replenishment mode light-emitting portion 65b emits flashing light at the same intervals. Also, when the amount of urea water stored is equal to or greater than 50% but less than 75%, the speaker 66 generates a buzzer sound at short intervals, such as "beep, beep, beep," and the urea water replenishment mode light-emitting portion 65b emits flashing light at the same intervals. When the amount of urea water stored is equal to or greater than 75%, the speaker 66 generates a continuous sound such as "beeeeeeeep," and the urea water replenishment mode light-emitting portion 65b continuously emits flashing light.

When the informing switch 65 is pressed again and the controller 60 receives a signal from the informing switch 65 while the fuel replenishment mode light-emitting portion 65a or the urea water replenishment mode light-emitting portion 65b emits light and the speaker 66 generates a sound, the controller 60 stops the emission of the light from the light-emitting portions 65a, 65b and stops the generation of the sound from the speaker 66. In addition, after the passage of a predetermined time period since the fuel or urea water replenishment mode ON signal is received, the controller 60 causes the light-emitting portions 65a, 65b and the speaker 66 to automatically stop emitting light and generating a sound, even when the informing switch 65 is not pressed again.

Additionally, even when the main switch 13 of the operator cabin 11 is turned on but the vehicle is not ON (when the engine EG is driven), as long as the informing switch 65 is turned on, the controller 60 receives power from the vehicle battery and executes such informing described above by using the light-emitting portions 65a, 65b and the speaker 66. Once the main switch 13 is turned on, the controller 60 causes the fuel meter 17 and urea water meter 18 provided in the operator cabin 11 to display the amount of fuel stored in the fuel tank 45 that is detected by the fuel sensor 48 and the amount of urea water stored in the urea water tank 55 that is detected by the urea water sensor 58.

In this crawler loader 1, when the fuel replenishment mode light-emitting portion 65a of the informing switch 65 is pressed, the fuel replenishment mode light-emitting portion 65a emits light and the speaker 66 generates a sound, in which the light emission pattern and the sound generation pattern are changed according to the amount of fuel stored in the fuel tank 45 that is detected by the fuel sensor 48. For this reason, even when fuel is supplied from a portable can (a portable tank) at a working site or the like, the amount of fuel stored in the fuel tank 45 can be obtained based on the light emission pattern of the fuel replenishment mode light-emitting portion 65a and the sound generation pattern of the speaker 66, without checking the fuel filler opening 45a or the fuel meter 17 in the operator cabin 11, as is performed conventionally. This configuration, therefore, can prevent the overflow of the fuel from the fuel filler opening 45a when the fuel tank becomes full during the fuel supply operation. Consequently, the fuel supply operation can easily be carried out with less burden for the person performing the fuel supply operation.

Moreover, in the crawler loader 1, when the urea water replenishment mode light-emitting portion 65b of the informing switch 65 is pressed, the urea water replenishment mode light-emitting portion 65b emits light and the speaker 66 generates a sound, in which the light emission pattern and the sound generation pattern are changed according to the amount of urea water stored in the urea water tank 55 that is detected by the urea water sensor 58. For this reason, when the urea water replenishment operation is performed, the amount of urea water stored in the urea water tank 55 can be obtained based on the light emission pattern of the urea water replenishment mode light-emitting portion 65b and the sound generation pattern of the speaker 66, without checking the urea water replenishing port 55a or the urea water meter 18 in the operator cabin 11. This configuration, therefore, can prevent the overflow of the urea water from the replenishing port 55a when the urea water tank 55 becomes full during the replenishment operation, accomplishing an easy urea water replenishment operation.

In addition, in the crawler loader 1, the informing switch 65 is provided in the vicinity of the fuel filler opening 45a and the replenishing port 55a, wherein turning the informing switch 65 on leads to the execution of the informing. Thus, the replenishment operation can be carried out immediately by simply turning the informing switch 65 on in the vicinity of the fuel filler opening 45a and the replenishing port 55a. Also, the informing device is configured to automatically stop the informing after the passage of a predetermined time period since the informing switch 65 is turned on, preventing the person performing the replenishment operation from forgetting to turn off the informing device (the informing switch 65).

The above has described the embodiment of the present invention. However, the scope of the present invention is not limited to the foregoing embodiment. For instance, while the foregoing embodiment describes the configuration in which both the amount of fuel stored in the fuel tank 45 and the amount of urea water stored in the urea water tank 55 are reported, a configuration is possible in which only either one of the stored amounts is reported. Also, although the foregoing embodiment describes the configuration in which each of the stored amounts is reported by emitting light from the light-emitting portion 65a, 65b of the informing switch 65 and generating a sound from the speaker 66, a configuration is possible in which either light or sound is used. In addition, according to the foregoing embodiment, the present invention is applied to the crawler loader 1; however, the present invention can be applied to working vehicles other than the crawler loader, such as a power shovel.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A working vehicle, comprising:
   a vehicle equipped with an engine;
   a fluid tank for storing fluid;
   a sensor for detecting a stored amount of fluid stored in the fluid tank;
   an informing device for informing the stored amount detected by the sensor, by changing an information pattern in response to the stored amount,
   the informing device comprising a speaker by which sound pattern is made as the information pattern;
   sound pattern produced by the speaker is changed in response to the stored amount; and
   a battery provided in the vehicle;
   wherein the informing device receives electrical power from the battery to inform the stored amount, and the power supply is switched on and off by the informing switch;
   the informing device has an informing switch provided in the vicinity of a replenishing port of the fluid tank and outside of the fluid tank so that operator can turn the switch on; and
   the informing device is placed in the vicinity of the replenishing port of the fluid tank, and the information can be given to the operator in the vicinity.

2. The working vehicle according to claim 1, wherein the informing being performed when the informing switch is turned on.

3. The working vehicle according to claim 2, wherein the informing device is configured to automatically stop the informing after passage of a predetermined time period since the information switch is turned on.

4. The working vehicle according to claim 2, wherein the informing device performs the informing using at least either sound or light.

5. The working vehicle according to claim 1, wherein the fluid is a fuel used to drive the engine.

6. The working vehicle according to claim 1, further comprising an exhaust gas purification system for purifying exhaust gas discharged from the engine, by using urea water, and
   the fluid is the urea water.

7. The working vehicle according to claim 1, wherein the sensor detects a stored amount of fluid stored in the fluid tank with respect to at least one predetermined fluid level stored in the fluid tank, and the speaker produces a buzz sound at longer intervals when the sensor detects the amount of the fluid stored is less than the predetermined level than the buzz sound produced by the speaker when the sensor detects the amount of the fluid stored is equal to or more than the predetermined level.

8. The working vehicle according to claim 1, wherein the informing device is capable of informing the stored amount detected by the sensor by changing the sound pattern produced by the speaker in response to the stored amount even when the engine is not driven.

9. A working vehicle, comprising :
a vehicle equipped with an engine;
a fluid tank for storing fluid;
a sensor for detecting a stored amount of fluid stored in the fluid tank;
an informing device for informing the stored amount detected by the sensor, by changing an information pattern in response to the stored amount,
the informing device comprising a light-emitting device by which light-emitting pattern is made as the information pattern;
light-emitting pattern produced by the light-emitting device is changed in response to the stored amount; and
a battery provided in the vehicle;
wherein the informing device receives electrical power from the battery to inform the stored amount, and the power supply is switched on and off by the informing switch;
the informing device has an informing switch provided in the vicinity of a replenishing port of the fluid tank and outside of the fluid tank so that operator can turn the switch on; and
the informing device is placed in the vicinity of the replenishing port of the fluid tank, and the information can be given to the operator in the vicinity.

10. The working vehicle according to claim 9, wherein the informing being performed when the informing switch is turned on.

11. The working vehicle according to claim 10, wherein the informing device is configured to automatically stop the informing after passage of a predetermined time period since the information switch is turned on.

12. The working vehicle according to claim 9, wherein the fluid is a fuel used to drive the engine.

13. The working vehicle according to claim 9, further comprising an exhaust gas purification system for purifying exhaust gas discharged from the engine, by using urea water, and the fluid is the urea water.

14. The working vehicle according to claim 9, wherein the sensor detects a stored amount of fluid stored in the fluid tank with respect to at least one predetermined fluid level stored in the fluid tank, and the light-emitting device produces a flashing light at longer intervals when the sensor detects the amount of the fluid stored is less than the predetermined level than the flashing light produced by the light-emitting device when the sensor detects the amount of the fluid stored is equal to or more than the predetermined level.

15. The working vehicle according to claim 9, wherein the informing device is capable of informing the stored amount detected by the sensor by changing the light-emitting pattern produced by the light-emitting device in response to the stored amount even when the engine is not driven.

* * * * *